United States Patent [19]

Andrews et al.

[11] 4,351,924

[45] Sep. 28, 1982

[54] ω-, AND α,ω-HYDROXYHYDROCARBYL-(ALKYL METHACRYLATE) POLYMERS AND PROCESS

[75] Inventors: Gerald D. Andrews, Hockessin; William H. Sharkey, Wilmington, both of Del.

[73] Assignee: E. I. Du Pont de Nemours and Company, Wilmington, Del.

[21] Appl. No.: 243,731

[22] Filed: Mar. 16, 1981

[51] Int. Cl.$^3$ ............................................. C08F 120/18
[52] U.S. Cl. .................................. 525/330.6; 525/369; 526/173; 526/181; 526/250; 526/251; 526/312; 526/329.7; 560/205; 560/223; 560/224; 560/225
[58] Field of Search ............... 526/173, 181, 250, 251, 526/312, 329.7; 525/329, 369; 560/205, 225, 223, 224

[56] References Cited

U.S. PATENT DOCUMENTS

| 3,078,254 | 2/1963 | Zelinski et al. | 260/45.5 |
| 3,639,367 | 2/1972 | Halasa | 260/85.1 |
| 3,862,100 | 1/1975 | Halasa et al. | 526/181 |
| 4,200,718 | 4/1980 | Tung et al. | 526/181 |

OTHER PUBLICATIONS

Journal Polymer Science, vol. 12, No. 1, 153–166, Jan. (1974), Schulz et al.
Polymer Letters, vol. 2, pp. 217–222 (1964).
Trans Faraday Soc. (1965) 61, pp. 150–158.
Polymer Science & Tech., vol. 11, Klempner et al. Plenum Press 1980, pp. 137–152.

*Primary Examiner*—William F. Hamrock
*Attorney, Agent, or Firm*—James A. Costello

[57] ABSTRACT

Alkyl methacrylate polymers which have one or more hydroxyhydrocarbyl end groups and a process for making them employing an anionic initiator followed by hydrolysis. The polyfunctional polymers are useful in automobile powder finishes and the monofunctional polymers are useful in polymer blends.

16 Claims, No Drawings

ω-, AND α,ω-HYDROXYHYDROCARBYL-(ALKYL METHACRYLATE) POLYMERS AND PROCESS

BACKGROUND OF THE INVENTION

The alkyl methacrylate polymers of this invention are characterized by one or more hydroxyhydrocarbyl end groups. The term "polymers" in this context includes copolymers as well. Preparation of these polymers includes the steps of anionic polymerization with an anionic initiator followed by hydrolysis of the initiator end group(s) to create hydroxyl functionality at those positions.

Terminal hydroxy-functional PMMA has been prepared; Simms, "Polymer Science and Technology," V. 11, Klempner and Frisch, ed., Plenum Press, New York, 1980, pages 137 to 152. The preparation consists of initiation of methyl methacrylate polymerization with an azo initiator in the presence of 2-mercaptoethanol chain transfer agent. This process leads to PMMA with about 85% of the chains containing hydroxyl groups, and with a labile sulfur atom linking each hydroxyl to its polymer chain.

U.S. Pat. No. 3,862,100 discloses anionic polymerization initiators containing acetal functions, which initiators can be reacted further to make the initiators employed in the process of this invention. This patent also discloses hydrolysis of bis(acetal-ended) polymers and copolymers of conjugated dienes to the corresponding bis(hydroxyl-ended) polymers.

Wiles and Bywater, *Trans. Faraday Soc.* 1965, 61, 150, disclose that 1,1-diphenylhexyllithium, made by adding butyllithium to 1,1-diphenylethylene, brings about polymerization of methyl methacrylate in toluene and reacts more preferentially with the C=C of the methacrylate than with the C=O. Freyss et al., in *Polymer Letters*, Volume 2, pages 217 to 222 (1964), disclose use of 1,1-diphenylethylene to get linear styrene/methyl methacrylate block copolymers from "living" polystyrene.

U.S. Pat. No. 3,078,254 discloses coupling of living poly(methyl methacrylate) with organic dihalides. Inaba and Ojima, in *Tetrahedron Letters*, 1977, No. 23, 2009, disclose oxidative coupling, employing $TiCl_4$, of methyl isobutyrate through a silyl intermediate. Rathke and Lindert, in *J. Am. Chem. Soc.*, 1971, 93, 4605, disclose treatment of ethyl isobutyrate with lithium cyclohexyl(isopropyl)amide and with $CuBr_2$ to give coupling to diethyl tetramethylsuccinate.

U.S. Pat. No. 3,639,367 discloses the joining of anionically polymerized hydrocarbon rubbers via oxidative coupling with a monohalogenated hydrocarbon. Hild and Rempp, in *C.R. Acad. Sc. Paris*, 1969, Series C, 1622 to 1624, and Beinert et al., in *Faraday Discuss. Chem. Soc.* 1974 (57), 27, disclose the coupling of living poly(methyl methacrylate) employing ethylene dimethacrylate.

Polymerization Mechanisms In General

A brief description of vinyl polymerization mechanisms will help place this invention in context. Vinyl polymerizations proceed in more-or-less discrete steps which include all or some of the following:
1. Initiation
2. Propagation
3. Chain transfer
4. Chain branching
5. Termination.

In an ideal anionic polymerization, the rate of initiation is infinitely faster than the rate of propagation with no chance for chain transfer, branching or spontaneous termination to occur. The steps are schematized in the following equations where $In^\ominus$ represents the initiating anion (with appropriate counter cation not represented) and M represents a monomer unit:

$$In^\ominus + M \rightarrow In\text{-}M^\ominus \text{[Initiation]} \quad (1)$$

$$In\text{-}M^\ominus + nM \rightarrow In\text{-}(M)_{n+1}^\ominus \text{[Propagation]}. \quad (2)$$

Such polymerizations proceed by a "living" mechanism which is to say that when propagation is complete the anionic terminus of the polymer has a finite lifetime and is capable of adding more monomer of the same or different kind with resultant chain lengthening. The polymerization can then be deliberately terminated in one of several ways if desired. It follows that the degree of polymerization (DP) is determined directly from the ratio of monomer concentration ([M]) to initiator concentration ([In]), and the number average molecular weight of the polymer ($\overline{M}_n$) is simply the product of the DP and the monomer unit molecular weight ($MW_m$) plus the molecular weight of the initiator moiety ($MW_{In}$):

$$[M]/[In] = DP \quad (3)$$

$$\overline{M}_n = DP \times MW_m + MW_{In} \quad (4)$$

$$\overline{M}_n = [M]/[In] \times MW_m + MW_{In}$$

or

The more nearly ideal the system is, the less will be the molecular weight broadening. In the ideal case, the polymer will be monodisperse ($\overline{M}_w/\overline{M}_n = 1 + 1/DP$). Divergence from ideality will increase this ratio. In practice, absolute monodispersity is not achievable but can be closely approached so that $\overline{M}_w/\overline{M}_n$ values only slightly greater than the theoretical limit are obtained.

The alkyl methacrylates are a class of monomer amenable to such polymerizations so that, for example, methyl methacrylate (MMA) polymers with $\overline{M}_w/\overline{M}_n$ of about 1.01 to 1.1 are possible. Narrow molecular weight distribution copolymers of MMA with other alkyl methacrylates have also been obtained and such manipulations enable one to vary polymer physical properties such as glass transition temperature, hardness, heat distortion temperatures, and the like.

For use in automobile finishes, the polymers must contain functional groups which can participate in crosslinking reactions. Such groups should also afford the possibility of chemical modification so as to provide hardness, flexibility, durability and the like. In methacrylate polymers, these properties can be conferred by providing the polymers with hydroxyl functionality.

SUMMARY OF THE INVENTION

This invention concerns polymers having the following formula:

$$(HO-R-CH_2C(C_6H_5)_2-(\text{Methacrylate ester})_x)_m Q$$

wherein:

R is selected from alkylene of 1 to 20 carbons, cycloalkylene of 5 to 10 carbons, alkylenearylene of 7 to 32 carbons, arylene of 6 to 12 carbons, and alkylenearylenealkylene of 8 to 33 carbons;

"Methacrylate ester" represents combined units derived from one or more anionically polymerizable methacrylic acid esters in random or block copolymer segments, said esters having the formula $CH_2=C(CH_3)COOR'$, where R' is selected from:
(a) alkyl of 1 to 18 carbon atoms,
(b) alkenyl of 2 to 18 carbon atoms,
(c) alkadienyl of 5 to 18 carbon atoms,
(d) dialkylaminoalkyl of 4 to 12 carbon atoms,
(e) alkoxyalkyl of 3 to 12 carbon atoms,
(f) lower fluoroalkyl;
x is a number between 2 and 1000;
Q is selected from hydrogen, a carbon-carbon bond, an m-valent hydrocarbyl radical and a network polymer formed by polymerization of the methacrylate ester of a polyol;
m is 1 when Q is hydrogen, 2 when Q is a carbon-carbon bond, 1 to 6 when Q is a hydrocarbyl radical and more than 1 and up to 100 when Q is a network polymer.

The preferred R component is alkylene, especially polymethylene of 3 carbons. Preferred methacrylate esters are methyl methacrylate and butyl methacrylate. The preferred value for x is 10 to 20. Preferred values for Q are hydrogen, a carbon-carbon bond, benzenepolymethylene of the formula $C_6H_{6-m}(CH_2)_m$ where m is 2 to 6, and a network polymer.

This invention also concerns a process for making the disclosed alkyl methacrylate polymers (including copolymers) comprising the steps, in sequence, of:
(i) polymerizing one or more methacrylate esters in the presence of an anionic initiator which is the reaction product of (a) an organo(alkali metal) compound having a hydroxyl group blocked by an acetal or ketal function and (b) 1,1-diphenylethylene, and
(ii) hydrolyzing the blocked hydroxyl group of the polymer to effect terminal hydroxyl functionality.

Polymers having terminal polyhydroxyl functionality are prepared by reacting the polymer produced in step (i) with a coupling agent, followed by hydrolyzing the coupled polymer.

This invention also concerns a process for preparing the disclosed polymers comprising the steps, in sequence of:
(i) polymerizing one or more methacrylate esters in the presence of an anionic initiator which is the reaction product of (a) an ethylenic double bond-containing organo(alkali metal) compound, and (b) 1,1-diphenylethylene, and
(ii) hydrating the double bond by hydroboration followed by oxidation to effect terminal hydroxyl functionality.

Polymers having terminal polyhydroxyl functionality are prepared by reacting the polymer produced in step (i) with a coupling agent, followed by hydroboration and then by oxidation to effect terminal polyhydroxyl functionality.

DETAILS OF THE INVENTION

Monomers

Representative methacrylate monomers include the following:

Alkyl methacrylates such as methyl, ethyl, propyl, butyl, s-butyl, t-butyl, hexyl, octyl, 2-ethylhexyl, decyl, dodecyl, and octadecyl methacrylates;

Alkenyl methacrylates such as vinyl, allyl, methallyl, undecenyl, and 9-octadecenyl methacrylates;

Alkadienyl methacrylates such as 2,4-pentadienyl, 2,4-hexadienyl, 2,4-octadienyl, 4,7-octadienyl, 9,12-octadecadienyl, and geranyl methacrylates;

Dialkylaminoalkyl methacrylates such as 2-dimethylaminoethyl, 3-dimethylaminopropyl, 6-diethylaminohexyl, 2-diethylaminoethyl, 2-dibutylaminoethyl, 2-dihexylaminoethyl, and 6-dimethylaminohexyl methacrylates;

Alkoxyalkyl methacrylates such as 2-methoxyethyl, 2-ethoxyethyl, 2-butoxyethyl, and 3- and 4-methoxybutyl methacrylates;

Fluoroalkyl methacrylates such as 2,2,2-trifluoroethyl and $1\underline{H},1\underline{H},5\underline{H}$-perfluoropentyl methacrylates.

Initiators

It is important in the process of this invention that the initiator contains a hydroxyl group precursor which resists reaction with lithium metal. Examples of appropriate precursors include blocked hydroxyl groups such as acetal or ketal functions, and ethylenic double bonds. The acetal or ketal-containing precursors are hydrolyzed to effect hydroxy functionality; the double bond-containing precursors are hydroborated and the hydroborated intermediate is oxidized to effect hydroxy functionality. Representative organo(alkali metal) compounds which can be used to form the initiator by reaction with 1,1-diphenylethylene are as follows, wherein n is 1 to 20:

Compounds Containing Acetal or Ketal Functions

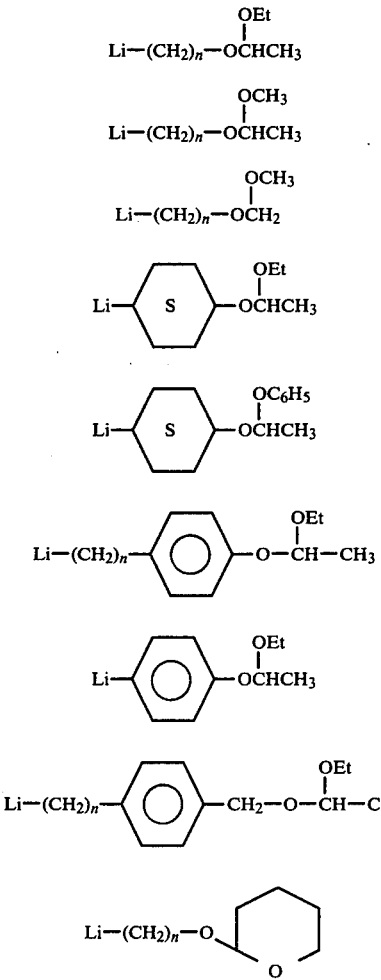

-continued
Compounds Containing Acetal or Ketal Functions

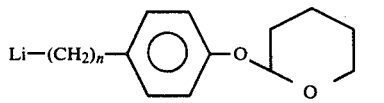

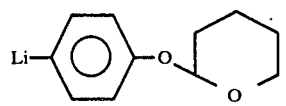

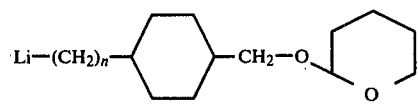

Na—(CH$_2$)$_n$—acetal

K—(CH$_2$)$_n$—acetal

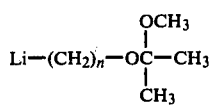

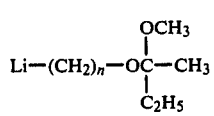

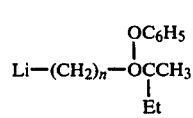

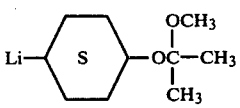

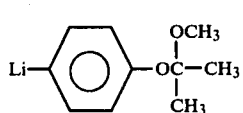

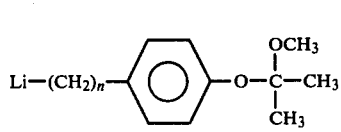

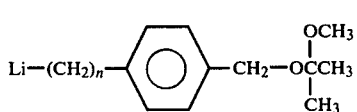

Na—(CH$_2$)$_n$—ketal

K—(CH$_2$)$_n$—ketal.

Alkenyllithium Compounds
 Vinyllithium
 2-Propenyllithium
 3-butenyllithium
 2-pentenyllithium
 3-pentenyllithium
 4-pentenyllithium
 Undecenyllithium.
Alkenyllithium compounds in which the ethylenic double bond is terminal are preferred.

Couplers

Coupling reagents which can be employed in the process of this invention fall into three general classes:
 (i) oxidative coupling reagents,
 (ii) organic polyhalides, and
 (iii) addition coupling reagents.

Representative of oxidative coupling reagents which can be employed are TiCl$_4$, CuBr$_2$, and I$_2$.

Representative of organic polyhalide coupling reagents are halomethylbenzenes such as the bis-, tris-, and tetrakis(bromomethyl)benzenes; dibromomethane, 1,4-diiodobutane, and 1,12-diiodododecane. Others include 1,5-bis(bromomethyl)naphthalene and 4,4'-bis(bromomethyl)bipheny.

Representative of addition couplers are ethylene dimethacrylate and methacrylate esters of higher linear diols [HO(CH$_2$)$_p$OH], trimethylolpropane, trimethylolethane, polyethylene glycols, pentaerythritol, glycerol, bisphenol A, and the like.

Ether solvents such as tetrahydrofuran, glyme (1,2-dimethoxyethane), diglyme (di(2-methoxyethyl)ether), and diethyl ether are employed in the polymerization process of this invention. Temperatures below $-30°$ C. are necessary and preferred temperatures are about $-70°$ C. and below. Any alkali metal counter ion can be employed; however, lithium is preferred.

HPLC Separation

Acetal-ended PMMA can be separated from hydroxyl-ended PMMA by high performance liquid chromatography (HPLC). The acetal-ended PMMA (DP 10) elutes near the solvent front ($k'\cong0$) from a silica gel column with ethyl acetate eluent. The polar hydroxyl group of the hydroxy-terminal PMMA (DP 10) causes it to be more strongly retained on the column and elute later ($k'\sim0.6$). The value, $k'$, equals [retention volume]/[retention volume of unretained components]-1.

The $\alpha,\omega$-dihydroxy PMMA is yet more strongly retained by virtue of its extra hydroxyl group ($k'\sim1.7$). In a similar way, the star polymers produced by coupling of living PMMA with poly(bromomethyl)benzenes can be separated into fractions containing 1, 2, 3, and 4 hydroxyl groups. Furthermore, since the molecular weights of these functional polymers increase in direct proportion to the number of hydroxyl groups, GPC molecular weight determination of the $\overline{M}_n$'s of fractions isolated by preparative HPLC provides a direct proof of the structures of the separated components.

The following Examples illustrate the invention. Temperatures are in degrees Celsius and concentrations are by weight unless otherwise indicated.

EXAMPLES

All glassware, syringes, and needles used for the polymerization runs were dried at 150° for 4 hours. The apparatus was assembled while hot, flushed with argon (passed through activated molecular sieve and Girdler nickel columns), and kept under a positive argon pressure during the reactions. Solvents and reagents were added via syringe through rubber serum caps. The reactions were stirred with Lab Glass precision glass stirrers powered by standard variable speed motors. Temperatures were measured with an Omega Model 2165A digital thermometer using copper-constantan thermocouples.

Commercial methyl methacrylate was purified and dried by filtration through alumina (0.1 g/g monomer), inhibited with phenothiazine (0.01%), and degassed with argon immediately prior to use. Except as otherwise noted, tetrahydrofuran (THF) was freshly distilled with sodium-benzophenone under nitrogen.

Poly(methyl methacrylate) samples were freed of low molecular weight impurities as follows: An acetone or THF solution of the polymer (1 g/10 mL) was suction-filtered through a Celite ® pad and then slowly poured into rapidly stirred hexane (100 mL/g of polymer). The finely divided powder was isolated by suction filtration on a medium-porosity sintered-glass Buchner funnel. It was air-dried for several hours and then dried in a vacuum desiccator (0.5 mm) for 12–24 hours. NMR spectra (60 MHz) were recorded on 10 to 15% (w/w) solutions in chloroform-d.

Analytical HPLC was performed on a system comprising an Altex model 110A pump, an Altex 3.2×250 mm Lichrosorb ® Si 60 5-micron particle size silica gel column, a Schoeffel Spectroflow ® Monitor SF 770 UV Detector, a Waters Model R401 Refractive Index Detector, and a Hewlett Packard Model 7132N Dual-pen Recorder. Polymer separations were accomplished with ethyl acetate as elutent at 1.0 ml/min and with UV detection at 254 nm. The peaks are identified by k' values. GPC molecular weight determinations were performed on u-Styragel ® columns using Lucite ® 40 as standard. Thin layer chromatography was performed on Brinkman 5×20 cm sil G-25 UV 254, 0.25 mm precoated silica gel plates. The polymers were eluted with ethyl acetate and the spots were visualized with UV light or with iodine.

PREPARATION

Ethyl-3-Lithiopropyl Acetaldehyde Acetal (1-Ethoxy-1-(3-lithiopropoxy)ethane)

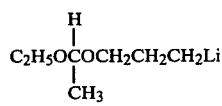

The following method of preparation is according to that of Eaton et al., *J. Org. Chem.*, 37, 1947 (1972). A 500 mL reaction kettle with a 4-necked top was dried and equipped with an addition funnel, a stirrer, and a thermocouple well for a digital thermometer. The kettle was charged with 200 mL of dry ether and lithium wire (1.52 g, washed with methanol, then hexane). The addition funnel was charged with 3-chloropropyl ethyl acetaldehyde acetal (16.7 g, 0.1 mol) and a small amount (10%) was added to the reaction mixture and stirring was begun. When the reaction had started, as indicated by formation of a white precipitate and shiny spots on the lithium, the reaction mixture was cooled to −10° to −5° in an acetone/dry ice bath and kept at the temperature during the entire reaction. The remainder of the chloroacetal was added over 0.5 to 1 hour and the mixture stirred an additional 2 hours. At this point, the addition funnel was replaced with a serum cap and three 10 mL aliquots of the reaction mixture were removed and titrated with 1.0 M sec-butanol/xylene solution using 1,10-phenanthroline as indicator. The titration procedure was a modification of the method of Watson and Eastham, *J. Organomet. Chem.*, 165 (1967). Typically, the solution was 0.4 to 0.45 M, 80% to 90% yield. The solution was kept cold and used as soon as possible after titration.

EXAMPLE 1

A. Mono[5-(1-ethoxyethyl)-1,1-diphenylpentyl]PMMA ("PMMA Monoacetal")

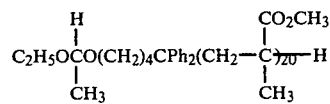

Ethyl 3-lithiopropyl acetaldehyde acetal was prepared as described in the Preparation and shown by titration to be 0.4 M. This reagent (25 mL, 10 mmol) was added to a solution of 1,1-diphenylethylene (1.89 g, 1.8 mL, 10.5 mmol) in THF (100 mL, freshly distilled from lithium aluminum hydride). This solution was cooled to −78° and methyl methacrylate (21.6 mL, 200 mmol) was added dropwise via syringe over about 15 min as the temperature held at about −70°. After ½ hour, methanol (1 mL, 25 mmol) was added to the clear, nearly colorless solution which was warmed to room temperature and poured into water (1 liter) and blended in a blender.

The fine white powder produced was isolated by suction filtration on a medium porosity sintered-glass Buchner funnel and dried in a vacuum desiccator for 3 days. The dried material was precipitated from THF (100 mL) solution into hexane (900 mL), isolated, and vacuum dried to give 22.0 g (95% yield) of PMMA monoacetal: GPC $\overline{M}_n$ 1800, $\overline{M}_w$ 2200, PDI 1.22 (polydispersity index); 60 MHz $^1$H NMR, delta 7.2 (bs, phenyl, integral 25.5), 3.65 (bs, OCH$_3$, integral 198.5; model compounds revealed that the signals from the OCH$_2$ protons from the CH$_3$(CH$_3$CH$_2$O)HCOCH$_2$-group are under this signal), 1.90 (bs, CH$_2$), and 0.9 (bs, CH$_3$): DP 25. Lower-molecular-weight samples revealed the presence of a weak quartet at δ4.6 EtO(RO)CHCH$_3$) as well as methyl signals in the δ1–1.4 region.

B. Mono(5-hydroxy-1,1-diphenylpentylPMMA) ("Monohydroxy PMMA")

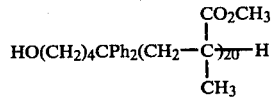

Acetal polymer from Part A (5.07 g) was dissolved in THF (100 mL), and water (10 mL) and concentrated HCl (1.0 mL) were added. The clear, colorless solution was stirred at room temperature for 90 min.

TLC analysis of the starting material showed one spot at R$_f$ 0.62. Analysis of the reaction at 15 min showed this spot and a new one at R$_f$ 0.50, and analysis at 45 min showed only the R$_f$ 0.50 spot.

The reaction mixture was poured into rapidly stirred water (900 mL) and the solid was isolated and vacuum dried to give 4.45 g of monohydroxy PMMA (91% yield) as a white powder. GPC analysis of a separately hydrolyzed sample of this material gave $\overline{M}_n$ 2600, $\overline{M}_w$ 2900, PDI 1.11.

Monohydroxy polymers are useful as the A segments in ABA block copolymers. The B segments can be low T$_g$ polyester or polyether polymers. The ABA block copolymer is then an elastomer which can serve as the binder in finishes which are flexible at low temperatures. Block polymers made from monohydroxy polymers of the invention have advantages over those of Simms (supra, Background of the Invention) in that they contain no oxidatively unstable sulfur in the chain and all of the polymer chains are functionalized.

Comparative Example A

Attempted Coupling of living PMMA via ketene acetal/TiCl$_4$

Butyllithium (6.25 mL, 10 mmol) was added to a solution of 1,1-diphenylethylene (1.8 mL, 10 mmol) in THF (200 mL) at room temperature. After 15 min, the red solution was cooled to $-78°$ and methyl methacrylate (10.6 mL, 100 mmol) was added over 10 min. The nearly colorless solution was stirred an additional 10 min and a 20 mL aliquot was removed with a dry syringe and quenched in water (200 mL) to furnish a control sample.

Trimethylsilyl chloride (3.2 mL, 25.2 mmol) was added to the cold solution which was stirred for 30 min and then warmed to room temperature. Titanium tetrachloride (1.1 mL, 1.9 g, 10 mmol) was added to the clear, colorless solution. The yellow solution was stirred 1 hr and then poured slowly into rapidly stirred water. The control and product polymer samples were separately isolated by filtration and dried overnight in vacuo. Each was then precipitated from THF into hexane and again dried in vacuo to give a 50% yield of PMMA. GPC; $M_n$ 1000 for both; control $\overline{M}_w/\overline{M}_n$, 1.23, and product $\overline{M}_w/\overline{M}_n$ 1.26.

Comparative Example B

Coupling of living PMMA with TiCl$_4$

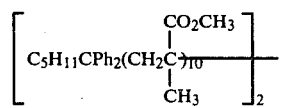

A polymerization reaction identical to that of Comparative Example A was run in only 100 mL of THF. A 10 mL control sample was removed and then titanium tetrachloride (1.1 mL, 10 mmol) was added at $-78°$. The solution was warmed to room temperature, stirred 30 min, and quenched in water (2 L). The control sample and product were dried in vacuo overnight. The product was dissolved in THF (50 mL) and filtered through a coarse sintered glass funnel into water (1.5 L). The colorless solid was isolated and dried in vacuo. The 60 MHz $^1$H NMR spectra were nearly identical and showed DP 10 for both samples. GPC; control $\overline{M}_n$ 700, $\overline{M}_w$ 1000; and product $\overline{M}_n$ 1100, $\overline{M}_w$ 1600. This molecular weight increase corresponds to a 75% yield in the coupling reaction. Comparative Examples A and B demonstrate that living PMMA cannot be coupled by the ketene acetal/TiCl$_4$ method but can be coupled with TiCl$_4$ alone. This is surprising in view of Inaba and Ojima's report, page 2 supra, disclosing the coupling of a model monomeric compound by the ketene acetal/TiCl$_4$ method.

EXAMPLE 2

α,ω-Bis(5-hydroxy-1,1-diphenylpentylPMMA) ("α,ω-Dihydroxy PMMA") by coupling with TiCl$_4$

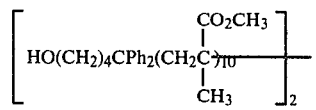

Ethereal ethyl 3-lithiopropyl acetaldehyde acetal, made as described in the Preparation, was shown by titration to be 0.32 M. The lithium reagent (69 mL, 22 mmol) was added to a solution of 1,1-diphenylethylene (4.0 mL, 23 mmol) in THF (200 mL) at $-78°$. The solution was warmed to 20° and after 5 min it was cooled to $-78°$. Then, methyl methacrylate (23.5 mL, 220 mmol) was added over 15 min (rate varied to keep the temperature at $-70°$). A 20 mL aliquot was removed and quenched in water (200 mL) to provide control Sample A.

To the cold ($-78°$) polymer solution was added titanium tetrachloride (2.4 mL, 22 mmol). After 30 min of stirring, the mixture was warmed to room temperature, stirred 15 min, and transferred via cannula to a beaker of stirred water (3 L). Some of the polymer coagulated into a gummy mass which was removed, blended with water (500 mL), isolated, dried in vacuo, dissolved in THF (30 mL), filtered, precipitated in hexane (300 mL), and dried to give Sample B. The rest of the polymer was isolated by suction filtration through Celite ® diatomaceous earth filter-aid. The solid was stirred with THF (100 mL) and filtered. The filtrate was poured into hexane (500 mL) and the solid isolated and dried in vacuo to give Sample C. The weights and NMR-determined DP's are shown below:

| Sample | DP | Wt (g) | Yield (%) |
| --- | --- | --- | --- |
| A | 9 | 1.85 | 6.4 |
| B | 13 | 8.5 | 29.4 |
| C | — | 13.3 | 46.0 |

A portion of Sample B (1.0 g) was dissolved in THF (100 mL). Water (10 mL) and concentrated HCl (1 mL) were added and the solution was stirred for 2.5 hr and then poured into water (1 liter) and the precipitate isolated and air-dried. A 1 g sample of A was hydrolyzed similarly. TLC analysis of Samples A and B showed one component at R$_f$ 0.66. The hydrolyzed Samples A showed one spot at R$_f$ 0.47 (monohydroxy PMMA) while the hydrolyzed Sample B showed two spots at R$_f$ 0.40 ( , -dihydroxy PMMA) and 0.47 (monohydroxy PMMA, minor component). HPLC analysis of hydrolyzed Sample B (and hydrolyzed Sample C) showed that the relative amount of double-ended (k' 1.71) and single ended (k', 0.60) polymers (1.52:1) correspond to a 60% yield in the titanium tetrachloride coupling reaction.

Pure samples of the two components in the hydrolysis product from Sample C were obtained by preparative scale liquid chromatography. The k'=0.60 component has $M_n$ 800, $M_w$ 1000, PDI 1.15 and the k'=1.77 component has $M_n$ 1700, $M_w$ 1900, PDI 1.06.

EXAMPLE 3

4-Phenylenedimethylenebis-(5-hydroxy-1,1-diphenyl-pentylPMMA)

("α,ω-Dihydroxy PMMA") by coupling with α,α'-dibromo-p-xylene

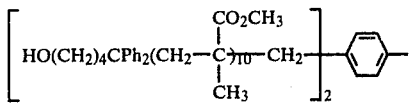

To an ice-cooled solution of 1,1-diphenylethylene (4.4 mL, 25 mmol) in THF (200 mL) was added an 0.39 M ethereal solution of ethyl 3-lithiopropyl acetaldehyde acetal made by the procedure of the Preparation (63.5 mL, 25 mmol). After 15 min, the solution was cooled to −78° and methyl methacrylate (26.8 mL, 250 mmol) was added over about 10 min with the temperature below −65°. The solution was stirred for 5 min and a 25 mL aliquot was removed and quenched in water (500 mL) to provide Sample A. Solid α,α'-dibromo-p-xylene (2.97 g, 11.2 mmol) was added to the reaction which was stirred overnight and gradually warmed to room temperature. Another 25 mL aliquot was removed and quenched to give Sample B. THF (50 mL) and 2 M aqueous HCl (25 mL) were added to the reaction and the solution was stirred 7 hr and then poured into water (3 liters) and the solid was isolated and dried to give Sample C. Sample A (less a small amount for analysis) was stirred in THF (25 mL) containing aqueous 2 M HCl (2.5 mL) for 6 hr and then precipitated in water (500 mL) to give Sample A'. Samples A' and C were precipitated 3 times from acetone into hexane and dried in vacuo to give α,ω-dihydroxy PMMA, C (27.13 g, 83% yield), and ω-monohydroxy PMMA, A' (2.42 g, 7.4% yield), both as colorless glassy solids:
Sample A'[1]: GPC $\overline{M}_n$ 800, $\overline{M}_w$ 900, PDI 1.09; NMR, DP 9.9.
Sample C: GPC $\overline{M}_n$ 1700, $\overline{M}_w$ 2000, PDI 1.21; NMR, DP 12.5.

Samples A and B give single peaks near the solvent fronts (k'=0) on HPLC analysis. Sample A' shows a single peak, k'=0.62. Sample C shows two peaks and k'=0.33 and k'=1.08 in relative areas of 19:81 from the refractive index trace. Pure samples of the two components of Sample C were isolated by preparative HPLC. GPC; k'=0.33 component, $\overline{M}_n$ 800, $\overline{M}_w$ 1200 and k'=1.08 component, $\overline{M}_n$ 2200, $\overline{M}_w$ 2300.

EXAMPLE 4

1,3,5-Benzenetrimethylenetris(5-hydroxy-1,1-diphenyl-pentylPMMA)

Star polymer from coupling of living PMMA with 1,3,5-tris(bromomethyl)benzene

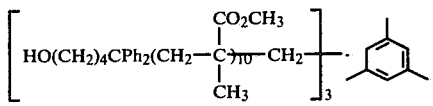

Functionalized living PMMA was prepared as in Example 3. An aliquot (25 mL) was removed and quenched in water (500 mL) to provide a control, Sample A. Solid 1,3,5-tris(bromomethyl)benzene (2.68 g, 7.5 mmol) was added (it dissolved in about 10 min) and the mixture was stirred at −78° C. for 45 min, warmed to room temperature, and poured into rapidly stirred water (3 L) containing sodium bicarbonate (10 g). The solid produced was isolated, dried, and precipitated from acetone into hexane to give the acetal-ended star polymer, Sample B, as a fluffy white powder (40.5 g). Samples A and B (less 1 g as control sample) were hydrolyzed as in Example 3 to give Samples A' (2.4 g) and B' (31.0 g), after two precipitations from acetone into hexane for Sample A' and one for Sample B'.

α-Monohydroxy PMMA, A': GPC $\overline{M}_n$ 900, $\overline{M}_w$ 1000, PDI 1.13; NMR DP 12.4.

Poly(ω-Hydroxy) star PMMA, B': GPC $\overline{M}_n$ 2800, $\overline{M}_n$ 2800, PDI 1.14; NMR DP 11.1.

Analytical HPLC of Sample B' showed 2 peaks with k' values of 0.72 and 1.61. Pure samples of each of the two components were isolated by preparative HPLC. The relative areas (weight percent from refractive index detector) and GPC molecular weights of the isolated fractions are shown below:

| Fraction | k' | Weight Percent | $\overline{M}_n$ | $\overline{M}_w$ | PDI | Structure |
|---|---|---|---|---|---|---|
| 1 | .72 | 49 | 2200 | 2300 | 1.05 | dihydroxy PMMA |
| 2 | 1.61 | 51 | 2800 | 2900 | 1.03 | trihydroxy PMMA |

EXAMPLE 5

1,2,4,5-Benzenetetramethylenetetrakis(5-hydroxy-1,1-diphenylpentylPMMA)

Coupling of living "PMMA Acetal" with 1,2,4,5-tetrakis(bromomethyl)benzene

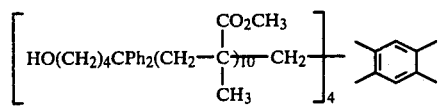

Acetal-ended living PMMA was prepared as in Example 3. An aliquot (25 mL) was removed and quenched in water (25 mL) to provide a control, Sample A. Solid 1,2,4,5-tetrakis(bromomethyl)benzene (2.53 g, 5.6 mmol) was added and the mixture was stirred 2 hr (the solid dissolved after about 30 min) and poured into water (3 L). The solid produced was isolated, dried, and precipitated from acetone into hexane to give the acetal-ended star polymer, Sample B, as a fluffy white powder. Samples A and B were hydrolyzed as in Example 4 to give Samples A' (2.39 g) and B' (28.69 g):

α,-Monohydroxy PMMA, A': GPC $\overline{M}_n$ 1000, $\overline{M}_w$ 1100, PDI 1.13; NMR DP 12.3

Poly(ω-Hydroxy) star PMMA, B': GPC $\overline{M}_n$ 2400, $\overline{M}_w$ 2900, PDI 1.24; NMR DP 10.3

Analytical HPLC of Sample B' showed 4 peaks with k' values of 0.45, 0.76, 1.59, and 2.76. Pure samples of each of these components were isolated by preparative HPLC. The relative areas (weight percent from refractive index detector) and GPC molecular weights of the isolated fractions are shown below:

| Fraction | k' | Weight Percent | $\overline{M}_n$ | $\overline{M}_w$ | PDI | Structure |
|---|---|---|---|---|---|---|
| 1 | 0.45 | 23 | 1000 | 1100 | 1.19 | Monohydroxy PMMA |
| 2 | 0.76 | 24 | 2200 | 2400 | 1.09 | Dihydroxy PMMA |
| 3 | 1.59 | 40 | 3000 | 3200 | 1.05 | Trihydroxy PMMA |

| Frac-tion | k' | Weight Per-cent | $\overline{M}_n$ | $\overline{M}_w$ | PDI | Structure |
|---|---|---|---|---|---|---|
| 4 | 2.76 | 13 | 3700 | 3900 | 1.06 | Tetrahydroxy PMMA |

EXAMPLE 6

Coupling of acetal-ended living PMMA with ethylene dimethacrylate

Two samples of acetal-ended living PMMA were prepared as in Example 3. An aliquot (50 mL) was removed from each and quenched and hydrolyzed as in Example 3. Ethylene dimethacrylate (see below for amounts) was added to each reaction mixture dropwise over 3 min. The solutions were stirred for 30 min, 2 M HCl (10 mL) was added, and stirring was continued overnight as the solutions slowly warmed to room temperature. The mixtures were poured into water (4 L) and the solids isolated and dried. Each control and product sample was precipitated from THF into hexane, isolated, and dried. GPC molecular weights of the materials are given below:

| Sample | Mmol of Ethylene Dimethacrylate | $\overline{M}_n$ | $\overline{M}_w$ | PDI |
|---|---|---|---|---|
| Control 1 | — | 1300 | 1500 | 1.13 |
| Product 1 | 11 | 2900 | 3900 | 1.36 |
| Control 2 | — | 1200 | 1400 | 1.15 |
| Product 2 | 18 | 4000 | 5700 | 1.43 |

EXAMPLE 7

Urethane coating from α,ω-dihydroxy PMMA

A mixture of α,ω-dihydroxy PMMA prepared by the method of Example 2 (72% coupling yield, DP 10 before coupling, 0.62 g, 0.5 mmol of hydroxyl groups based on 1240 g/hydroxyl), glycerine (18.4 mg, 0.2 mmol, 0.6 mmol of hydroxyl groups) and 2,4-tolylene diisocyanate (78.5 uL, 0.55 mmol, 1.1 mmol of isocyanate groups) in acetone (3 mL) was spread as thin films on borosilicate glass plates. After the acetone had evaporated, the plates were heated to about 200° C. on a hot plate for ½ hr. Similar films were prepared without glycerine or isocyanate. The isocyanate-cured films were much more acetone-resistant upon the uncured ones. The uncured films were too brittle to measure hardness; the cured films had a Knoop hardness of approximately 40 according to test method ANSI/ASTM C 849-76.

EXAMPLE 8

Pigmented urethane coating from star trihydroxy MMA/BMA copolymer

A. Millbase was prepared from a hydrolyzed glycidyl methacrylate block copolymer having the approximate composition:

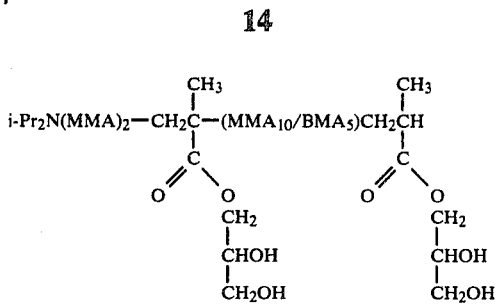

$\overline{M}_n$ 2000, $\overline{M}_w$ 2500, PDI 1.23

Lithium diisopropylamide (0.05 mole) was made by mixing 0.05 mole each of butyllithium and diisopropylamine in THF. To this was added 0.1 mole of methyl methacrylate at −77° C. to form the initiator, following which were added sequentially 0.05 mole of glycidyl methacrylate (GMA), a mixture of 0.47 mole of MMA and 0.24 mole of butyl methacrylate (BMA), and finally 0.05 mole of GMA. The epoxide functions of the combined GMA units were hydrolyzed to the dihydroxy functions shown in the above formula by treating the product with dilute aqueous sulfuric acid for three days at room temperature.

Toluene (87.5 g) and the copolymer (9.4 g) were shaken in a screw-capped jar until the copolymer dissolved. Sand (30.0 g) and TiO₂ (65.6 g) were added and the mixture shaken on a paint shaker for 45 min. The mixture was filtered through a medium grade paint strainer to give millbase of the following composition:

| Pigment/Binder | 698/100 |
|---|---|
| % Binder | 5.8 |
| % Pigment | 40.4 |
| % Solids | 46.2. |

B. The polymer used as binder in this Example was prepared by substantially the method of Example 4. The initiator was prepared from 200 mmol of 1,1-diphenylethylene and 200 mmol of ethyl 3-lithiopropyl acetaldehyde acetal. The monomers were a mixture of 720 mmol of methyl methacrylate and 620 mmol of butyl methacrylate, followed by 400 mmol of methyl methacrylate; 22.13 g of 1,3,5-tris(bromomethyl)benzene was used as the coupling agent. The polymer had the following composition:

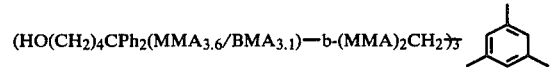

$\overline{M}_n$ 2800, $\overline{M}_w$ 3100, PDI 1.1.

Formulation of Paint

The following ingredients were mixed to make the paint:

| Ingredient | Total Wt. | Wt. Solids |
|---|---|---|
| Hydroxy star polymer | 8.0 g | 8.0 g |
| Methyl Ethyl Ketone (MEK) | 3.3 g | — |
| Toluene | 3.2 g | |
| Desmodur ® N[a] | 1.4 g | 1.4 g |
| Millbase Ex 8A | 9.2 g | 4.2 g |
| 10% DBTDL[b] in methyl ethyl ketone | 0.02 g | — |

| Ingredient | Total Wt. | Wt. Solids |
|---|---|---|
| | 25.12 g | 13.60 g |

[a] Desmodur® N is $OCN(CH_2)_6N[CONH(CH_2)_6NCO]_2$
[b] DBTDL is di-n-butyl tin dilaurate which is used at 0.1 wt % on binder solids.

Drawdowns of the paint formulation (54% solids, P/B 37.4/100) were made on black dip primed Bonderite® 40 panels using an 8 mil (0.2 mm) applicator. After curing under ambient conditions for 24 hrs, the average film properties were: 20° gloss, 77, and 60° gloss 93, according to ANSI/ASTM D 22 44–78; Knoop hardness 4.1; film build, 0.074 mm.

EXAMPLE 9

Pigmented urethane coating from α,ω-dihydroxy MMA/BMA copolymer

The α,ω-dihydroxy MMA/BMA copolymer used as the binder has the following structure:

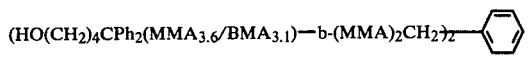

$\bar{M}_n$ 1700, $\bar{M}_w$ 2000, PDI 1.1.

The copolymer was prepared by substantially the method of Example 3. The initiator was prepared from 200 mmol of 1,1-diphenylethylene and 199 mmol of ethyl 3-lithiopropyl acetaldehyde acetal. The monomers were a mixture of 715 mmol of methyl methacrylate and 616 mmol of butyl methacrylate, followed by 397 mmol of methyl methacrylate; 24.25 g (91.9 mmol) of α,α'-dibromo-p-xylene was used as the coupling agent.

The paint was formulated with the above binder and applied as in Example 8 except that the amount of Desmodur® N (1.6 g) was changed: 54.5% solids, P/B 36.6/100. Film properties after 24 hr under ambient conditions were 20° gloss 64, 60° gloss 95, and Knoop hardness 3.1, and film build 0.038 mm.

EXAMPLE 10

Pigmented urethane coating from α,ω-dihydroxy PMMA

The α,ω-dihydroxy PMMA used as the binder in this Example had $\bar{M}_n$ 4700, $\bar{M}_w$ 4800, and PDI 1.0. It was prepared by substantially the method of Example 3. The initiator was prepared from 100 mmol of 1,1-diphenylethylene and 100 mmol of ethyl 3-lithiopropyl acetaldehyde acetal. The monomer was 215 ml (2.02 moles) of methyl methacrylate, and 12.8 g (48.5 mmol) of α,α'-dibromo-p-xylene was used as the coupling agent.

A paint formulation (52.6% solids, P/D 40.6/100) of the polymer was made, applied, and cured as in Example 8 with the exception that only 0.6 g of Desmodur® N was used. Film properties were: 20° gloss 57, 60° gloss 91, Knoop hardness 9.8, and film build 0.056 mm.

EXAMPLE 11

Melamine coating from star trihydroxy MMA/BMA copolymer

A solution of the copolymer described in Example 8, Part B, (10.0 g), methyl ethyl ketone (10.0 g), hexamethoxymethylmelamine (1.4 g), and 10% p-toluenesulfonic acid in methyl ethyl ketone (0.2 g) was spread on glass plates with an 8 mil (0.2 mm) applicator. After 15 min of air drying the plates were baked for 30 min at 121° C. The coating had a Knoop hardness of 18.2.

EXAMPLE 12

Melamine coating from α,ω-dihydroxy MMA/BMA copolymer

The method of Example 11 was used with the copolymer described in Example 9 and 1.5 g of hexamethoxymethylmelamine. The cured film had a Knoop hardness of 15.7.

EXAMPLE 13

Monohydroxy PMMA

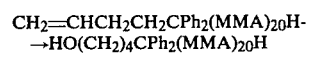

Part A

Allyllithium was prepared from allyl phenyl ether and lithium in THF/ether as described by Eisch and Jacobs, *J. Org. Chem.*, 28, 2145 (1963), with the exception that a Vibromixer® stirrer was used. The allyllithium was titrated as in the Preparation.

To an ice-cooled solution of 1,1-diphenylethylene (1.8 mL, 10 mmol) in THF (100 mL) was added a solution of allyllithium (0.8 M in 1:1 THF/ether, 25 mL, 10 mmol). The dark red solution was stirred 15 min, cooled to −78° C., and methyl methacrylate (21.4 mL, 200 mmol) was added at a rate which allowed the temperature of the reaction to remain below −68° C. (10 min). The solution was stirred and allowed to warm overnight, then it was poured into rapidly stirred hexane (2 L). The allyl-ended PMMA precipitated as a white powder which was precipitated from acetone into water and dried (13.5 g, 67%). Analysis by 90 MHz $^1$H NMR: DP 19.5, vinyl to phenyl ratio, 2.6:10 (3.0:10 in theory); GPC, $\bar{M}_n$ 1400, $\bar{M}_w$ 1800, PDI 1.3.

Part B

The allyl-ended polymer from Part A (3.0 g, about 1.5 mmol of allyl groups) was dissolved in THF (30 mL). Solid 9-borabicyclo[3,3,1]nonane (0.92 g, 7.5 mmol) was added and the solution was stirred for 1 hr. Then 15% (wt) of sodium hydroxide in water (15 mL) was added dropwise, with some gas evolution. Immediately, 30% (wt) of hydrogen peroxide in water (5 mL) was added dropwise. Strong cooling was required to keep the temperature below 50° C. After 15 min, the solution was poured into methanol (500 mL). The hydroxy-ended PMMA precipitated as a fine, hard-to-filter powder. The powder was isolated and dried (yield, 2.0 g, 67%).

HPLC analysis of the allyl-ended PMMA starting material (as above) showed a single peak, k'∼0. Similar analysis of the hydroxy-ended PMMA product showed a small amount of starting material (10%) as well as a new peak at k'=0.45 (90 %).

The embodiments of the invention in which an exclusive property or privilege is claimed are defined as follows:

1. A polymer consisting essentially of alkyl methacrylate polymers and copolymers having the formula:

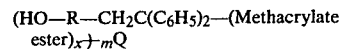

wherein:

R is selected from alkylene of 1 to 20 carbons, cycloalkylene of 5 to 10 carbons, alkylenearylene of 7 to 32 carbons, arylene of 6 to 12 carbons, and alkylenearylenealkylene of 8 to 33 carbons;

"Methacrylate ester" represents combined units derived from one or more anionically polymerizable methacrylic acid esters in random or block copolymer segments, said esters having the formula $CH_2=C(CH_3)COOR'$, where R' is selected from:

(a) alkyl of 1 to 18 carbon atoms,
(b) alkenyl of 2 to 18 carbon atoms,
(c) alkadienyl of 5 to 18 carbon atoms,
(d) dialkylaminoalkyl of 4 to 12 carbon atoms,
(e) alkoxyalkyl of 3 to 12 carbon atoms,
(f) lower fluoroalkyl;

x is a number between 2 and 1000;

Q is selected from hydrogen, a carbon-carbon bond, an m-valent hydrocarbyl radical and a network polymer formed by polymerization of the methacrylate ester of a polyol;

m is 1 when Q is hydrogen, 2 when Q is a carbon-carbon bond, 1 to 6 when Q is a hydrocarbyl radical and more than 1 and up to 100 when Q is a network polymer.

2. A polymer according to claim 1 wherein R is polymethylene.

3. A polymer according to claim 2 wherein R is trimethylene.

4. A polymer according to claim 1 wherein the methacrylate ester is selected from one or both of methyl methacrylate and butyl methacrylate.

5. A polymer according to claim 4 wherein the methacrylate ester is methyl methacrylate.

6. A polymer according to claim 4 wherein the methacrylate ester is butyl methacrylate.

7. A polymer according to claim 1 wherein Q is hydrogen.

8. A polymer according to claim 1 wherein Q is a carbon-carbon bond.

9. A polymer according to claim 1 wherein Q is benzenepolymethylene of the formula $C_6H_{6-m}(CH_2)_m$ wherein m is 2 to 6.

10. A polymer according to claim 9 wherein Q is xylylene.

11. A polymer according to claim 1 wherein Q is a network polymer and m is above 1 and up to 100.

12. A polymer according to any one of claims 1, 3, 4, 7, 8, 9, 10, or 11, wherein x is 10 to 20.

13. A process for preparing the polymer of claim 1, at a temperature below $-30°$ C. in the presence of an ether solvent, comprising the steps, in sequence, of:

(i) polymerizing one or more methacrylate esters in the presence of an anionic initiator which is the reaction product of (a) an organo(alkali metal) compound having a hydroxyl group blocked by an acetal or ketal function, and (b) 1,1-diphenylethylene, and (ii) hydrolyzing the blocked hydroxyl group of the polymer to effect terminal hydroxyl functionality.

14. A process according to claim 13 for preparing polymer having terminal polyhydroxyl functionality comprising reacting the polymer produced in step (i) with a coupling agent followed by hydrolyzing the coupled polymer.

15. A process for preparing the polymer of claim 1 comprising the steps, in sequence, of:

(i) polymerizing one or more methacrylate esters in the presence of an anionic initiator which is the reaction product of (a) an ethylenic double bond-containing organo(alkali metal) compound, and (b) 1,1-diphenylethylene, and (ii) hydrating the double bond by hydroboration followed by oxidation to effect terminal hydroxyl functionality.

16. A process according to claim 15 comprising reacting the polymer produced in step (i) with a coupling agent followed by hydrating the double bonds of the coupled polymer by hydroboration followed by oxidation to effect terminal polyhydroxyl functionality.

* * * * *